United States Patent
Francisco et al.

(10) Patent No.: US 9,237,153 B2
(45) Date of Patent: Jan. 12, 2016

(54) METHOD FOR AUTOMATICALLY CONFIGURATION AT LEAST ONE ENDPOINT

(71) Applicant: AASTRA TECHNOLOGIES LIMITED, Concord (CA)

(72) Inventors: Paulo Francisco, Concord (CA); Martin Bitzinger, Concord (CA)

(73) Assignee: MITEL NETWORKS CORP., Ottawa, Ontario (CA)

( * ) Notice: Subject to any disclaimer, the term of this patent is extended or adjusted under 35 U.S.C. 154(b) by 59 days.

(21) Appl. No.: 14/143,511

(22) Filed: Dec. 30, 2013

(65) Prior Publication Data

US 2014/0189843 A1 Jul. 3, 2014

Related U.S. Application Data

(60) Provisional application No. 61/747,684, filed on Dec. 31, 2012.

(51) Int. Cl.
| | |
|---|---|
| *H04L 29/06* | (2006.01) |
| *H04L 29/08* | (2006.01) |
| *H04W 4/00* | (2009.01) |
| *G06F 9/445* | (2006.01) |
| *G06F 21/33* | (2013.01) |
| *H04L 12/24* | (2006.01) |
| *H04L 12/58* | (2006.01) |

(52) U.S. Cl.
CPC .............. *H04L 63/0876* (2013.01); *G06F 8/60* (2013.01); *H04L 41/0803* (2013.01); *H04L 41/0886* (2013.01); *H04L 63/0428* (2013.01); *H04L 63/0853* (2013.01); *H04L 67/34* (2013.01); *H04W 4/001* (2013.01); *G06F 9/44505* (2013.01); *G06F 21/335* (2013.01); *H04L 41/082* (2013.01); *H04L 41/0806* (2013.01); *H04L 51/18* (2013.01); *H04L 63/083* (2013.01)

(58) Field of Classification Search
CPC .......... G06F 8/60; G06F 8/70; G06F 21/335; H04L 41/0806
USPC ............................................................. 726/9
See application file for complete search history.

(56) References Cited

U.S. PATENT DOCUMENTS

| | | | |
|---|---|---|---|
| 7,188,161 B1* | 3/2007 | O'Neil ................ | H04L 41/0806 709/217 |
| 2005/0060390 A1 | 3/2005 | Vakil et al. | |
| 2007/0253342 A1 | 11/2007 | Bierdeman et al. | |
| 2008/0046735 A1* | 2/2008 | Nedeltchev et al. .......... | 713/173 |
| 2008/0196024 A1* | 8/2008 | Barfield et al. ................ | 717/177 |
| 2008/0317004 A1* | 12/2008 | Cai et al. ....................... | 370/352 |
| 2009/0164668 A1 | 6/2009 | Duckett | |
| 2009/0165099 A1* | 6/2009 | Eldar et al. .......... | H04L 41/0869 726/5 |
| 2009/0245183 A1* | 10/2009 | Baker et al. ................... | 370/329 |
| 2013/0007869 A1* | 1/2013 | Thomas et al. ....... | G06F 21/335 726/9 |
| 2014/0230031 A1* | 8/2014 | Schneider et al. ...... | H04L 63/08 726/6 |

FOREIGN PATENT DOCUMENTS

WO 2011041916 4/2011

* cited by examiner

*Primary Examiner* — Izunna Okeke
*Assistant Examiner* — Bryan Wright

(57) ABSTRACT

A method for automatically configuring at least one mobile device associated with a user, via a client software application stored on said mobile device using a token generated by a provisioning server and a hashed username with a publicly available redirect server.

8 Claims, 3 Drawing Sheets

METHOD FOR AUTOMATICALLY CONFIGURATION AT LEAST ONE ENDPOINT

CROSS-REFERENCE TO RELATED APPLICATIONS

This application claims the benefit of priority to U.S. Provisional Application Ser. No. 61/747,684 filed on Dec. 31, 2012.

FIELD OF THE INVENTION

The present invention relates to packet switched networks, and more particularly to configuring endpoints for participation in a network.

DESCRIPTION OF THE RELATED ART

Mass provisioning is a challenge in most internet protocol (IP) based telephony rollouts. One significant difference between provisioning of endpoints in a public switched telephone network (PSTN) and an IP network is that PSTN phones comprise phone numbers that are statically assigned by connecting through a dedicated cable, whereas with IP networks an IP endpoint may be very complex and requires to be configured before use. For example, in a hosted PBX or IP Centrex environment an IP endpoint, such as an IP phone, can be configured by plugging the IP phone into a local area network (LAN), and the IP phone firmware obtains an IP address and other critical IP configuration information using requests that are compatible with Dynamic Host Configuration Protocol (DHCP) and BOOTP using options 67, and 60 or 66. Next, the IP phone automatically contacts a provisioning server and provides its unique identifier, such as a media access control (MAC) address. The provisioning server then forwards the configuration file with parameters or settings intended for that IP endpoint. However, this scheme only works because the IP endpoint is connected in a LAN and the configuration server IP address is delivered to the device via DHCP server options, or other means.

To date, the issue of configuration of IP endpoints in a non-hosted PBX, or non-IP Centrex environment, or mobile environments, has not been adequately or satisfactorily addressed. Typically, in these situations, each customer end point must be configured, managed and maintained individually, and so the user is often tasked to manually enter the configuration settings for the device, such as the service provider's provisioning server address or other network settings. For example, a mobile device may boot up in a completely private network or in an area without a network, such that DHCP mechanisms or other discovery mechanisms will not apply. Accordingly, in one approach a user downloads a mobile softphone application from an appropriate application store, and installs the application on the device. However, the installed application does not have any knowledge of an appropriate provisioning server to contact to obtain its requisite configuration data. Also, there is no information that associates a specific mobile device with a specific user on the PBX.

It is an object of the present invention to mitigate or obviate at least one of the above-mentioned disadvantages.

SUMMARY OF THE INVENTION

In one of its aspects, there is provided a method for automatically configuring at least one endpoint associated with a user, the method having the steps of:

registering said user with a host device and associating said user with access credentials and a unique email address;
providing client software to said at least one endpoint following said registration;
said client software requesting a customized configuration file for said at least one endpoint from said host device;
sending an email message having said configuration file to said unique email address; and
opening said configuration file to automatically configure said at least one endpoint.

In another of its aspects, there is provided a method for provisioning a plurality of endpoints, said method comprising the steps of:

at each of said endpoint, downloading and installing a client software program from a provisioning server;
at said provisioning server, sending an identical global configuration file each of said endpoints via email, said global configuration file comprising address location information associated with said provisioning server;
at each of said endpoint, executing said global configuration file to cause said endpoint to contact the provisioning server; and
at said provisioning server, sending an endpoint-specific configuration file to each of said endpoints.

In another of its aspects, there is provided a method for automatically configuring at least one endpoint associated with a user, via a client software application stored on said endpoint, said method comprising the steps of:

a provisioning server generating a token and an address file comprising addressing details of said provisioning server;
said provisioning server acquiring user credentials known to said user, said user credentials comprising a username and a password;
said provisioning server hashing said username using a cryptographic hash function and encrypting said address file and said token with said user's password to form redirection information;
sending said redirection information having said hashed username, said encrypted token and said address file from said provisioning server to a publicly available redirect server;
at said endpoint, said user inputting said username and hashing said username with said cryptographic hash function, and sending said hashed username to said redirect server as a query;
at said redirect server receiving said hashed username from said endpoint, and identifying said user based on the hashed username; and retrieving said redirection information associated with the hashed username; sending said redirection information comprising said encrypted token and said address file to said endpoint; and
at said endpoint, decrypting said received redirection information using said user's password to reveal said provisioning server addressing details; and initiating communication with said provisioning server and requesting a configuration file for configuring said endpoint client software application.

Advantageously, by facilitating substantially hassle-free installations or configuration of IP endpoints for end-users, the operational burden of service activation, requests for support for installation or technical assistance are substantially diminished or eliminated. Consequently, service providers are presented with a competitive time to market and a service cost advantage. Additionally, the use of hashed usernames with a publicly available redirect server enhances security, since the redirect server does not require any knowledge of the username or the password associated with the user; and the use of tokens obviates the need for a device MAC address or Unique Device Identifier (UDID).

BRIEF DESCRIPTION OF THE DRAWINGS

Several preferred embodiments of the present invention will now be described, by way of example only, with reference to the appended drawings in which.

DETAILED DESCRIPTION OF EXEMPLARY EMBODIMENTS

The detailed description of exemplary embodiments of the invention herein makes reference to the accompanying block diagrams and schematic diagrams, which show the exemplary embodiment by way of illustration and its best mode. While these exemplary embodiments are described in sufficient detail to enable those skilled in the art to practice the invention, it should be understood that other embodiments may be realized and that logical and mechanical changes may be made without departing from the spirit and scope of the invention. Thus, the detailed description herein is presented for purposes of illustration only and not of limitation. For example, the steps recited in any of the method or process descriptions may be executed in any order and are not limited to the order presented.

Moreover, it should be appreciated that the particular implementations shown and described herein are illustrative of the invention and its best mode and are not intended to otherwise limit the scope of the present invention in any way. Indeed, for the sake of brevity, certain sub-components of the individual operating components, conventional data networking, application development and other functional aspects of the systems may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The present invention may also be described herein in terms of screen shots and flowcharts, optional selections and various processing steps. The present invention may employ various integrated circuit components (e.g., memory elements, processing elements, logic elements, look-up tables, and the like), which may carry out a variety of functions under the control of one or more microprocessors or other control devices. Similarly, the software elements of the present invention may be implemented with any programming or scripting language such as C, C++, Java, COBOL, assembler, PERL, extensible mark-up language (XML), smart card technologies with the various algorithms being implemented with any combination of data structures, objects, processes, routines or other programming elements. Further, it should be noted that the present invention may employ any number of conventional techniques for data transmission, signaling, data processing, network control, and the like.

As is known in the art, Internet Protocol (IP) is a routing protocol designed to route traffic within a network or between networks. IP is described in IETF RFC-791, incorporated herein by reference. However, the present invention is not limited to IP data interfaces and other data interfaces can also be used.

Figure 1:
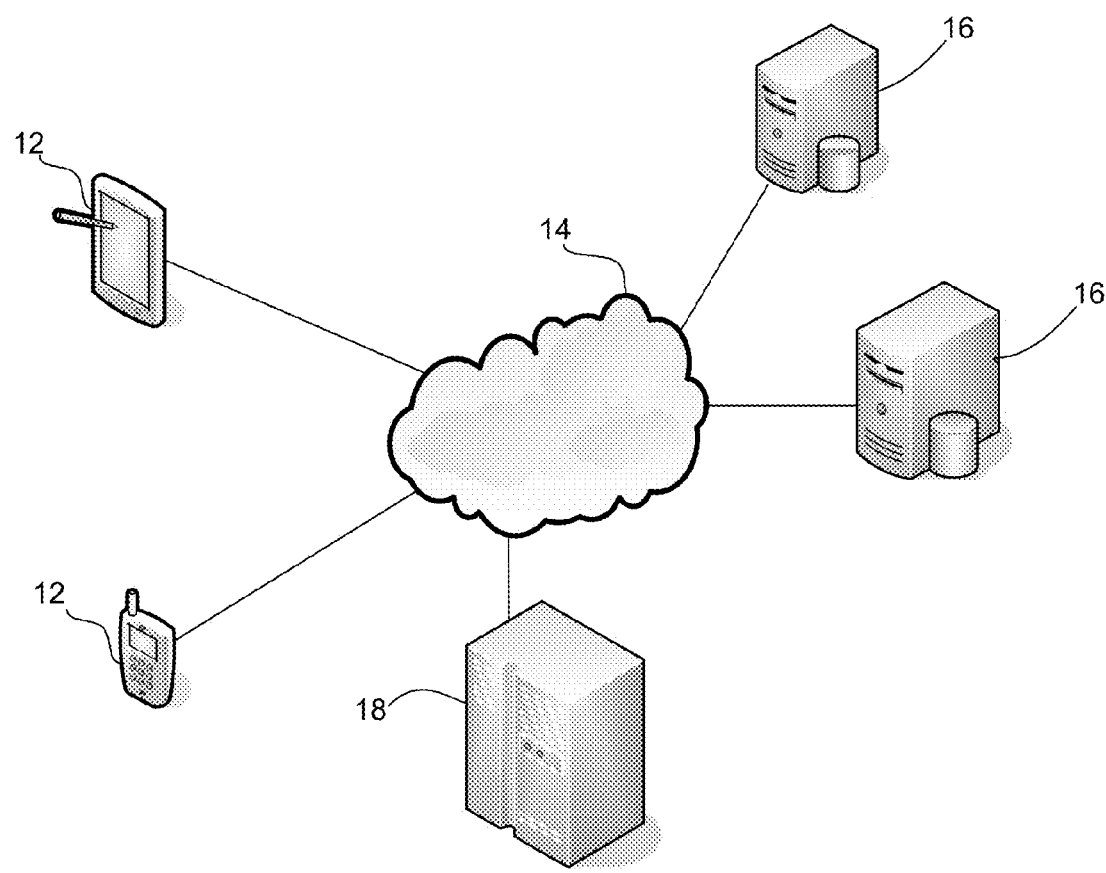
FIG. 1 shows a schematic diagram of a system for configuring an IP device, in an exemplary embodiment.

FIG. 1 illustrates a system 10 for configuring a plurality of network entities 12 with minimal end-user intervention, wherein minimal user intervention involves powering on and connecting the network entity 12 to a network 14. The network entities 12 may be any IP devices or endpoints (end nodes) for participating in a packet switched network, such as, but not limited to, IP phones, H.323 phones, DECT phones, SIP-DECT phones, ATAs, mobile phones, IPTVs, projectors, PDAs, digital cameras, PC, MP3 players, set-top boxes, game consoles, gateways, softphones, firewalls, access-points, modems, network appliances, or any combination(s) thereof. These exemplary endpoints 12 include a data processing means comprising a processor (which may be referred to as a central processor unit or CPU, logic means, or controller) that is in communication with a machine-readable medium (computer-readable medium), input/output (I/O) devices, a network interface, and other interfaces. A computer-readable medium is any physical object that can store information in a form directly readable by a computer. Thus, magnetic, optical, and electrical storage devices are all contemplated, as well as any other method of storing information directly accessible to a computer. Hard disks, floppy disks, CD/DVD ROM drives, RAM chips, magnetic tapes, barcodes, punch cards, and the like are all examples of computer-readable media.

Generally, the endpoints 12 are provisioned following execution of coded instructions or software programs stored in the computer-readable medium. The software application code may also be implemented in hardware via a dedicated device incorporating control logic or a controller, for example. The coded software instructions to be executed by the processor of the endpoint 12.

The endpoint 12 receives configuration data from a provisioning server 16, which may be remotely based and serves as a central depository of configuration information related to the endpoints 12. The provisioning server 16 also includes data processing means comprising a processor that is in communication with a computer-readable medium having data and/or program code, input/output (I/O) devices, a network interface, and other interfaces. The provisioning server 16 may be scalable, robust and may include failover capabilities and built-in redundancies.

Figure 2:
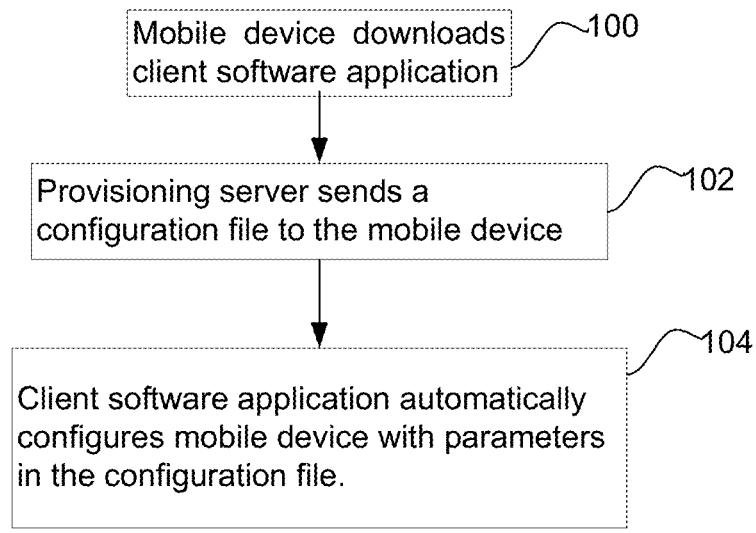
FIG. 2 is a flowchart outlining exemplary steps in a method for configuring an IP device, in an exemplary embodiment.

In one exemplary embodiment, an IP endpoint such as a mobile device 12 is provisioned to operate within a chosen network by following a plurality of exemplary steps, as shown in FIG. 2. In step 100, the mobile device 12 accesses an application store on the Internet, or a server, and downloads a client software application, such as a mobile softphone application or app, for subsequent installation thereon. Generally, the location or IP address of the provisioning server 16 is preconfigured with the device 12 i.e. firmware, or is known to the user. The softphone application provides a user interface for IP services, such as, making and receiving VoIP calls, video calls, videoconferencing, sending messages and managing presence over a Wi-Fi or a 3G/4G wireless connection. In order to download the software, the user is required to register with the application store by choosing a username, and password and entering an email address, among other information. Upon successful registration, the client software application initiates a communication session with a provisioning server 16. Next, the provisioning server 16 sends an email message bearing a configuration file as an attachment (email CFG file) to the user associated with device 12 (step 102). The configuration file is specific for that particular user, and therefore custom configuration files are sent to each user. The configuration file may comprise any of service details, or enterprise system information, port assignments, registration information, dial plan, NTP time settings, soft-keys, XML services and applications, SIP registration information, usernames and passwords, phone book directory, speaker volume settings and so forth. In step 104, opening the email attachment causes the mobile softphone application to automatically configure the device 12 using the parameters or settings contained in the configuration file.

Figure 3:
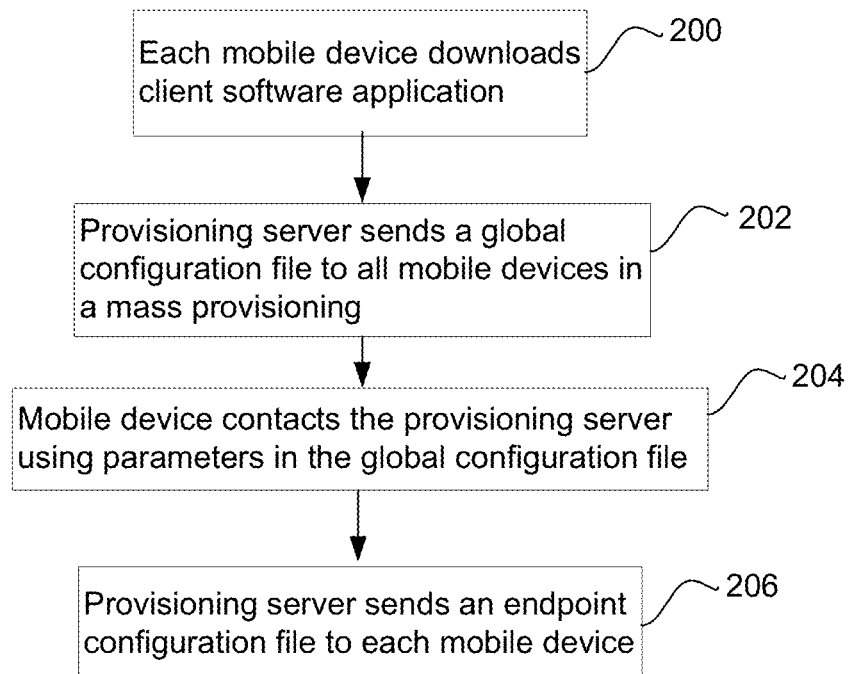
FIG. 3 is a flowchart outlining exemplary steps in a method for configuring an IP device, in another exemplary embodiment.

In another embodiment, the provisioning process is triggered by an email message that is sent to an IP endpoint, such as a mobile device 12, in which the email message includes a global configuration file as an attachment. The global configuration file comprises global information about the provisioning server 16, such as the location information (IP address/URI) of the provisioning server 16. As shown in FIG. 3, the provisioning process of an endpoint 12 comprises the exemplary steps of: at the endpoint 12, downloading and installing a client software program (step 200); at the provisioning server 16, sending an identical global configuration file to all endpoints 12 via email (step 202); and at the endpoint 12, executing said global configuration file to cause the endpoint 12 to contact the provisioning server 16 using location information provided with the global configuration file (step 204); and at the provisioning server 16, sending an endpoint configuration file to the endpoint 12 (step 206). The endpoint configuration file may include global settings for all mobile devices 12, endpoint specific settings, or user specific settings. For example, in order to obtain endpoint specific settings, the endpoint 12 may provide its endpoint type e.g. SIP phone or gateway, to the provisioning server 16. Whereas, to obtain user specific settings, the endpoint 12's globally unique network interface identifier (media access control (MAC) address) is sent to the provisioning server 16 and used as a unique identifier.

Accordingly, this provisioning method minimizes security concerns inherent in the previous embodiment. In addition, the e-mail configuration file that can be delivered completely independent of the accessible network in order to configure the client for the particular endpoint. The e-mail CFG file allows the client software application to retrieve additional parameters when the network becomes available. Alternatively, the e-mail CFG file can fully define the complete configuration for the client software program. As such, this approach obviates the step of sending individualized or custom configuration files to user devices 12. Accordingly, a single email message with a global configuration file is sent to all users, which greatly simplifies handling and enhances security as no user specific information is transmitted via insecure links. The endpoint configuration files (settings data etc), are subsequently pulled by the client software program from the indicated provisioning server 16. Updates of the endpoint configuration file may be further provided in which the most recent updated files take precedence over previous update files.

Figure 4:
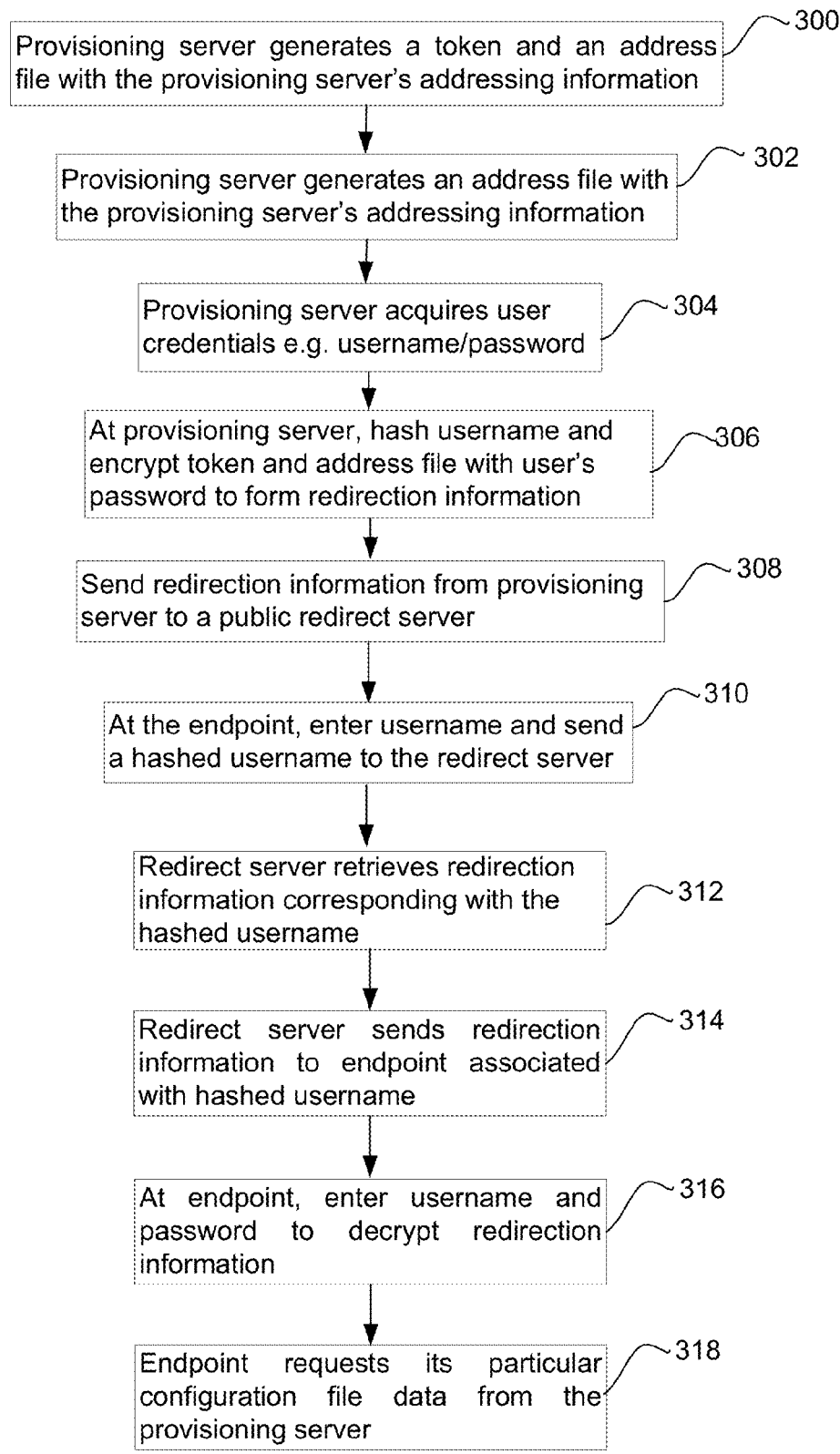
FIG. 4 is a flowchart outlining exemplary steps in a method for configuring an IP device, in yet an exemplary embodiment.

In yet another embodiment, an IP endpoint such as a mobile device 12 is provisioned to operate within a chosen network by following a plurality of exemplary steps, as shown in FIG. 4. At the step 300, the provisioning server 16 generates a token; and also generates an address file having the provisioning server 16 location information, such as an IP address or a uniform resource identifier (URI) (step 302). The provisioning server 16 then acquires user credentials known to the end users, such as username and password, from an internal directory, or by other means (step 304); and hashes the username using a cryptographic hash function, such as an MD5 Message-Digest Algorithm, and encrypts the provisioning server 16 location information and token with the user's password (step 306) to form redirection information. Next, the redirection information having the hashed username, encrypted token and the provisioning server 16 location information is sent from the provisioning server 16 to a publicly available redirect server 18 (step 308). The redirect server 18 matches up endpoints 12 with users and provisioning servers 20, such that sensitive information is not pushed to the public redirect server 18. Preferably, the redirect server 18 includes a database for storing the records of hashed usernames and the associated redirection information. At the endpoint 12, the user enters the username which is hashed using the same cryptographic hash function used at the provisioning server 16 and the hashed username is sent to the redirect server 18 (step 310). Next, the redirect server 18 receives the hashed username from the endpoint, and identifies the querying user based on the hashed username, and retrieves the redirection information associated with the hashed username (step 312); and then sends the redirection information comprising the encrypted token and the provisioning server 16 location information to the endpoint 12 (step 314). The received redirection information is decrypted at the endpoint 12 using the user's username and password to reveal the redirection information, such as the assigned provisioning server 16 location information (step 316). Finally, the endpoint 12 initiates communication with the provisioning server 16 requesting its particular configuration files (step 318) for configuring the endpoint client software. Advantageously, the redirect server 18 ensures that the redirection information can only be delivered to the intended target user, and the redirect server 18 does not require knowledge of the username or the password of the respective users. This is a desirable security feature as such information is therefore not stored on the publicly available redirect server 18. Additionally, by using the "token generated approach", the use of a device MAC or UDID is not required.

The provisioning server 16 includes configuration parameters specific to the endpoint 12 with a specific MAC address, including phone specific configuration information, and platform specific configuration information, such as, but not limited to, the type of phone, carrier, service, or enterprise system information, central server(s) URIs, port assignments, registration information, dial plan, NTP time settings, soft-keys, XML services and applications, SIP registration information, usernames and passwords, phone book directory, speaker volume settings and so forth. Firmware upgrades/downgrades may also be provided to the IP endpoint 12 based on the MAC address.

In yet another exemplary embodiment, the IP endpoint 12 may be programmed (firmware and/or software program) to contact the redirect server 18, or a plurality of redirect servers, each time it is powered on, rebooted or reset, or relocated within the same network or another network, in order receive settings data for auto-configuration, or firmware updates/downgrades.

In yet another exemplary embodiment, the configuration files and/or global configuration files are sent to the mobile device 12 via other means such as instant messaging.

The network 14 can include a series of network nodes (e.g., the clients and servers) that can be interconnected by network devices and wired and/or wireless communication lines (such as, public carrier lines, private lines, satellite lines, etc.) that enable the network nodes to communicate. The transfer of data between network nodes can be facilitated by network devices, such as routers, switches, multiplexers, bridges, gateways, etc., that can manipulate and/or route data from an originating node to a server node regardless of dissimilarities in the network topology (such as, bus, star, token ring, mesh, or hybrids thereof), spatial distance (such as, LAN, MAN, WAN, Internet), transmission technology (such as, TCP/IP, Systems Network Architecture), data type (such as, data, voice, video, multimedia), nature of connection (such as, switched, non-switched, dial-up, dedicated, or virtual), and/or physical link (such as, optical fiber, coaxial cable, twisted pair, wireless, etc.) between the correspondents within the network.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as critical, required, or essential features or elements of any or all the claims. As used herein, the terms "comprises," "comprising," or any other variations thereof, are intended to cover a non-exclusive inclusion, such that a process, method, article, or apparatus that comprises a list of elements does not include only those elements but may include other elements not expressly listed or inherent to such process, method, article, or apparatus. Further, no element described herein is required for the practice of the invention unless expressly described as "essential" or "critical."

The preceding detailed description is presented for purposes of illustration only and not of limitation, and the scope of the invention is defined by the preceding description, and with respect to the attached claims.

The embodiments of the invention in which an exclusive property or privilege is claimed are defined as follows:

1. A method for automatically configuring at least one endpoint associated with a user, via a client software application stored on said endpoint, said method comprising the steps of:
    a provisioning server generating a token and an address file comprising addressing details of said provisioning server;
    said provisioning server acquiring user credentials known to said user, said user credentials comprising a username and a password;
    said provisioning server hashing said username using a cryptographic hash function and encrypting said address file and said token with said user's password to form redirection information;
    sending said redirection information having said hashed username, said encrypted token and said address file from said provisioning server to a publicly available redirect server;
    at said endpoint, said user inputting said username and hashing said username with said cryptographic hash function, and sending said hashed username to said redirect server as a query;
    at said redirect server receiving said hashed username from said endpoint, and identifying said user based on the hashed username; and retrieving said redirection information associated with the hashed username; sending said redirection information comprising said encrypted token and said address file to said endpoint; and
    at said endpoint, decrypting said received redirection information using said user's password to reveal said provisioning server addressing details; and initiating communication with said provisioning server and requesting a configuration file for configuring said endpoint client software application.

2. The method of claim 1, wherein a unique network identifier associated with said at least one endpoint is sent to said provisioning server.

3. The method of claim 2, wherein said redirect server delivers said redirection information only to said target user.

4. The method of claim 3, wherein the use of said encrypted token does not require storage of user credentials on said publicly available redirect server.

5. The method of claim 3, wherein the use of said encrypted token does not require use of said endpoint's unique network identifier.

6. The method of claim 3, wherein the use of said encrypted token does not require storage of user credentials on said publicly available redirect server.

7. The method of claim 1, wherein said provisioning server associated with an application store.

8. The method of claim 3, wherein said configuration file comprises configuration settings data including device specific configuration information, and platform specific configuration information, including any of type of device, carrier, service, or enterprise system information, central server(s) URI(s), configuration server(s) URI, port assignments, registration information, dial plan, NTP time settings, softkeys, XML services and applications, SIP registration information, usernames and passwords, phone book directory, speaker volume settings.

* * * * *